(12) United States Patent
Dowdy et al.

(10) Patent No.: US 6,470,099 B1
(45) Date of Patent: Oct. 22, 2002

(54) SCANNER WITH MULTIPLE REFERENCE MARKS

(75) Inventors: Jacklyn Dowdy, Fort Collins, CO (US); Kevin John Youngers, Greeley, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/343,491

(22) Filed: Jun. 30, 1999

(51) Int. Cl.[7] .................................................. G06K 9/36
(52) U.S. Cl. ........................ 382/287; 382/312; 358/488
(58) Field of Search .................................... 382/312, 287, 382/289; 358/1–4, 488, 474

(56) References Cited

U.S. PATENT DOCUMENTS

| | | | | |
|---|---|---|---|---|
| 4,724,330 A | * | 2/1988 | Tuhro | 250/578 |
| 4,864,415 A | * | 9/1989 | Beikirch et al. | 358/474 |
| 4,933,778 A | * | 6/1990 | Tufano et al. | 358/488 |
| 5,115,478 A | | 5/1992 | Sugiura | 382/50 |
| 5,144,455 A | | 9/1992 | Stein et al. | 358/443 |

* cited by examiner

*Primary Examiner*—Yon J. Couso

(57) ABSTRACT

A document to be scanned is corner referenced on a transparent platen, with the document's image facing down. The platen defines an X-Y coordinate system. A moving line of light extends in the X direction and illuminates the document's image, line by line, as the line of light moves in the Y direction. The line of light that is thus reflected from the document is sensed by a linear CCD sensor array having a large number of individual sensor cells arranged in a line that extends in the X direction and coincides with the line of light. Multiple reference marks embodied in one or more reflection targets are located at a known position relative to the platen and/or its document referencing corner, to be scanned prior to scanning the document. Sensing of the reference marks enables (1) the X direction physical position of the CCD sensor array relative to the referencing corner to be accurately determined, (2) the Y direction physical position of the line of light relative to the referencing corner to be accurately determined, and (3) the platen's orientation with respect to the CCD array and line of light. A determination of the platen's orientation can include a determination of the platen's skew with respect to the CCD array and line of light, as well as a determination of the platen's orthogonality with respect to the direction of travel of a carriage which supports the CCD array and line of light.

20 Claims, 5 Drawing Sheets

SCANNER WITH MULTIPLE REFERENCE MARKS

FIELD OF THE INVENTION

The invention pertains to document scanners, and more specifically to methods and apparatus for determining the orientation of a scanner's platen with respect to its sensor array prior to the scanning of a document.

BACKGROUND OF THE INVENTION

In a document scanner of the type in which the invention finds utility, the scanner is conventionally provided with a platen on which a document is corner referenced for scanning. The platen's document referencing corner defines the X-axis and the Y-axis of an orthogonal coordinate system or matrix to which the picture element image content (PEL content) of the document is referenced during scanning.

A document is illuminated during scanning by a line or footprint of light that extends in the X direction and moves in the Y direction. Light is thus reflected from the document in a line-by-line or row-by-row fashion. In the case of a document comprising a black image on white paper, high intensity light is reflected from the document's white background PEL areas, and lower intensities of light are reflected from the document's black image PEL areas.

The platen may contain a horizontal, rectangular, transparent glass or glass-like member on which a document is corner referenced.

The line or footprint of reflected light is optically directed onto a linear array of light sensitive cells or elements that effectively extend in the X direction. An example of such an array is a CCD array whose individual cells define one pixel or PEL of the light footprint.

The convention that will be used in the following description defines the direction in which the light footprint extends, the direction in which the sensor array extends, and the direction in which the leading edge of the platen extends, as the X direction. The direction of relative movement between the document and the light footprint is defined as the Y direction. The sides of the platen extend in the Y direction.

It is conventional to designate the edge of a document that is positioned adjacent to the platen's leading edge as the document's leading edge. This document edge is the first portion of the document to be scanned by the light footprint. A rectangular document includes two side edges that extend in the Y direction, and that terminate at the document's trailing edge. While this is the usual configuration for a document scanner, the invention also finds utility in scanners that are capable of backward scanning.

A scan request may be for what is defined as a window scan. A window scan requests that a rectangular area within the body of the document be scanned. The leading edge of such a window is parallel to the document's leading edge, and may or may not be coincident with the document's leading edge.

When a document corner, as defined by its leading edge and one of its side edges, is positioned at one leading edge corner of the platen, the document is said to be corner referenced on the platen.

As mentioned, a document scanner can be used to scan an entire document, or only an internal portion or window thereof. In the case of a request to scan a window area within a document, the window area is defined by giving the X and Y coordinates of the window area referenced to the X-Y coordinate system that is defined by the platen.

As will be apparent, the effective (i.e. magnified) X direction length of the sensor array is somewhat greater than the X direction width of the document being scanned (for example, greater than 8½ inches).

When a request is received by the scanner to scan a document, or a window within the document, the signal content of the sensor array cells is not used (i.e., not read out into memory) until the Y direction position of the light footprint has reached the leading edge of the document (or portion of the document) that is to be scanned. Also, only the length of sensor cells that actually view a document or a document window are read out into memory (i.e., less than all of the cells are read out into memory).

For many years, it was the practice in the art to accurately construct a document scanner to insure that the above operation was achieved. This relatively expensive method of scanner construction was assumed to provide a known positional relationship between the sensor array, the footprint of light, and the image content of a document being scanned.

However, in these prior scanners the construction was not always performed as designated by the engineering specifications, thus leading to scan errors. Even when the scanner was constructed to the specified tight mechanical tolerances, subsequent rough handling of the scanner, and perhaps other factors such as subsequent temperature changes, caused document scanning errors to occur.

Thus, a need existed in the art for a method and apparatus which would periodically allow the mechanical position of the sensor array and the light footprint to be electrically or logically recalibrated relative to the mechanical position of other scanner components.

This need was partially met with the method and apparatus disclosed in U.S. Pat. No. 5,144,455 to Stein et al. for a "Method and Apparatus for Locating the Document Referencing Corner in a Document Scanner". Stein et al.'s patent discloses a document scanner as described above wherein a reflection target is located at a known position relative to a platen's document referencing corner. The reflection target is scanned prior to the scanning of a document. By scanning and then determining the location of the reflection target, the X direction physical position of a sensor array relative to a platen's document referencing corner can be accurately determined. This determination enables a scanner to discard light readings of sensor cells which lie beyond the side edges of a platen, as well as readings of sensor cells which lie beyond the side edges of a document window. Scanning and sensing of the reflection target also enables a scanner to accurately determine the Y direction physical position of the scanner's light footprint relative to the scanner's document referencing corner. This determination enables a scanner to discard sensor cell light readings which are taken prior to a point in time in which the sensor array has traveled far enough in the Y direction of a platen to reach the leading edge of a document or document window.

In summary, the method and apparatus disclosed in the patent of Stein et al. enable a document scanner to accurately locate the document referencing corner of a platen. The teachings of Stein et al. are hereby incorporated by reference.

In addition to knowing where a document referencing corner is in relation to a scan line, it is desirable to know whether a platen's leading edge is skewed with respect to a light footprint and cells of a sensor array, and whether a platen's leading edge is orthogonal to the direction of travel of a moving light footprint and sensor array.

It is the practice in the art to make these additional determinations by (1) accurately constructing a document scanner to insure that problems with skew and orthogonality will not arise, or (2) scanning a test target placed on the platen glass and then correcting for skew and orthogonality problems using firmware, software or the like. The greatest disadvantage associated with the first of these methods is expense. When the second method is performed as a part of the manufacturing process, it too can be expensive in that there is a loss of time incurred in the placement of a test target. Furthermore, it is unlikely that an end user of a document scanner will know when (and/or take the time) to place a test target on his or her scanner for recalibration purposes.

A need therefore exists for a method and apparatus which will periodically allow the mechanical position of a sensor array and light footprint to be electrically or logically recalibrated with respect to the orientation of a scanner's platen and other components.

SUMMARY OF THE INVENTION

The invention provides methods and apparatus for initially calibrating, or periodically recalibrating, the electronic and/or logic means of a scanner so as to ensure accurate scanning of a document, or a window within a document, without the need to rely upon a fixed and non-varying physical relationship between the sensor array, the moving footprint of light, the platen, and other elements of the scanner.

An advantage of the invention is to provide a scanner wherein the mechanical construction and alignment of various scanner members and parameters, such as the sensor array, the optical magnification of the scanning light footprint, and the position of the light path, can be constructed more easily, more economically, and to less stringent engineering specifications than was possible in the prior art.

It is a further advantage of the invention to provide a scanner which can be calibrated without the need to accurately position a test target on the scanner's platen for calibration purposes.

While past scanner manufacturing and calibration techniques have required a scanner's platen to be correctly oriented with respect to various scanner members and parameters, or have required the placement of a test target on a scanner's platen so that the test target can be scanned for the purpose of making adjustments in the use and interpretation of light readings taken by a sensor array, the invention disclosed herein provides a novel construction and arrangement whereby operation of the invention accurately determines the orientation of a scanner's platen with respect to scanner members such as the sensor array, the optical magnification of the scanning light footprint, and the position of the light path. At the same time that the orientation of the platen is determined, or closely in conjunction with said determination, the document referencing corner of the platen can also be determined, as taught by Stein et al. The orientation of the platen may be stored in memory so that recalibration of the scanner need only occur at periodic intervals rather than each time the scanner is turned on.

These and other important advantages and objectives of the invention will be further explained in, or will become apparent from, the accompanying description, drawings and claims.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
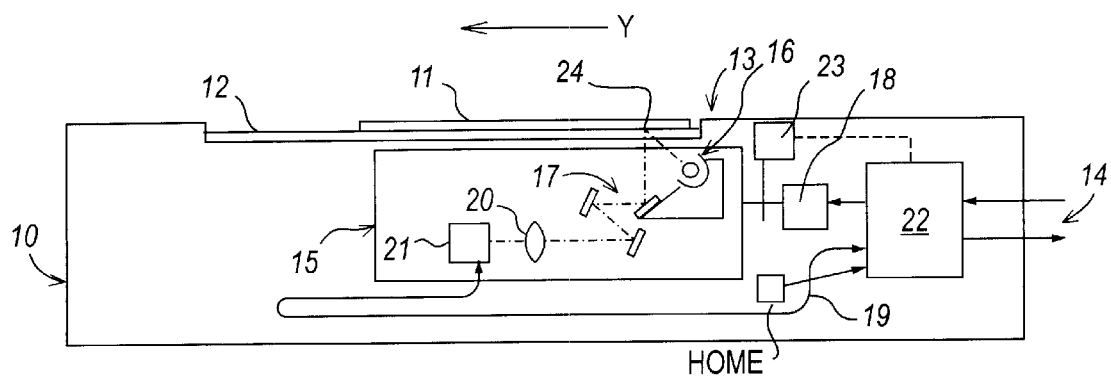
FIG. 1 is a partial schematic side view of a document scanner embodying the invention.

A document scanner 10 embodying the invention is shown in FIG. 1. Generically speaking, document scanner 10 is a flatbed scanner of the stationary document, moving light source type. However, the invention may also be employed in a scanner having a moving document/platen and a stationary light source. The invention may also be variously embodied and employed in other types and configurations of scanners.

The document scanner 10 shown in FIG. 1 is shown supporting a document 11 which is positioned on transparent platen 12. The image side of the document faces down. The downward facing side of document 11 is scanned so as to convert the visual images contained thereon into an electronic image that is useable by data processing machines and the like, for example host 45 of FIG. 4.

Document scanning is accomplished in FIG. 1 by movable carriage 15, which contains a linear light source 16 and an array of reflecting mirrors 17. Motor 18, which preferably is a stepping motor, is mechanically coupled to carriage 15 by gears, cables or the like. Motor 18 operates to move carriage 15 bidirectionally along the length of platen 12. Movement to the left in FIG. 1 is defined as scan movement, whereas movement to the right is defined as homing movement (though these assignments could easily be reversed). The direction of this movement is defined herein as movement in the Y direction, as is shown in FIG. 1 by an appropriately labeled arrow. The light footprint 24 that is reflected from platen 12 is redirected into lens 20, and then into light sensor 21 (best seen in FIG. 2).

Figure 5:
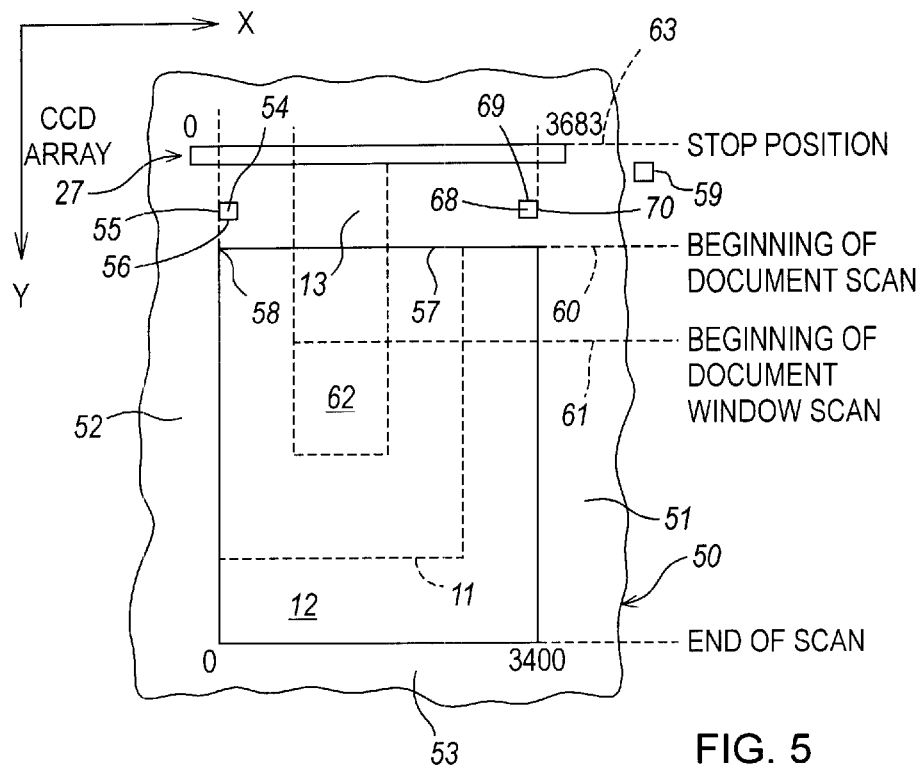
FIG. 5 is a bottom view of the document platen of FIG. 1, showing the scanner housing portions that support the platen, and showing one arrangement of reflection targets in accordance with the invention, the targets being located on a reference surface of the housing which is immediately adjacent to the leading edge of the platen and to the leading edge of a document that is positioned thereon.

Light source 16 operates to provide a relatively thin light footprint 24 that spans the X direction or width of platen 12 so as to illuminate both the platen 12, and preferably, one or both of the opaque sides 51, 52 abutting the platen, which sides 51, 52 are defined by the scanner housing and extend in the Y direction, as is best seen in FIG. 5. The home position of carriage 15 and light footprint 24 is such that the light footprint 24 illuminates an opaque leading edge portion 13 which abuts platen 12. Note that the opaque leading edge portion 13 and sides 51, 52 abutting the platen 12 may be referred to herein, either individually or in various combinations, as a reference surface.

Figure 3:
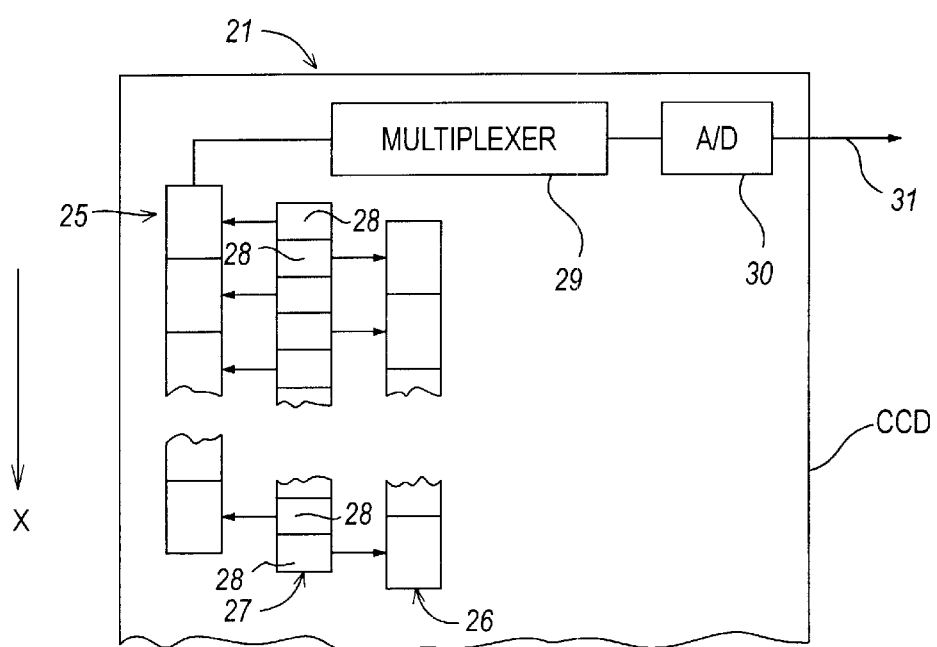
FIG. 3 is a partially broken away schematic view of the CCD array of FIG. 1, and of the circuitry and logic for handling and digitizing the analog signals that are provided by the individual CCD sensor cells as a result of light that is reflected to the CCD array.

With reference to FIG. 3, light sensor 21 preferably comprises a charge coupled device (CCD) or other sensor array 27 which is configured as a linear array of individual light detector cells 28. Each detector cell 28 of the sensor array 27 corresponds to a picture element or pixel (PEL) within the linear scan line that is defined by light footprint 24. CCD arrays that can distinguish a variety of PEL densities on the document (for example 300–1200 PELS per document inch) are readily available from contemporary commercial sources and provide high quality resolution.

Figure 2:
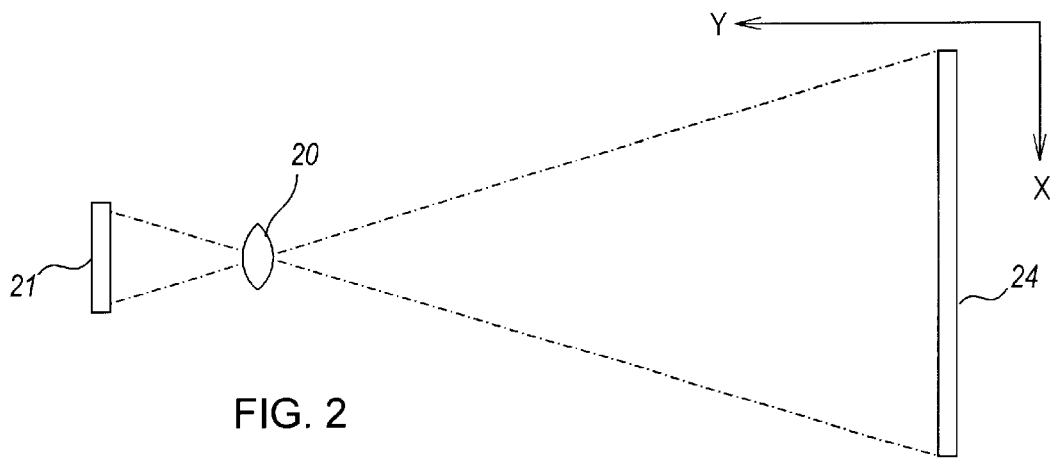
FIG. 2 is a linearized presentation showing the document object plane to CCD array image plane light reflection path of the FIG. 1 scanner, as well as the manner in which the length of the CCD array is effectively magnified to be substantially equal to the length of the scanner's light footprint.

The optical view of CCD array 27 (or light sensor 21) is amplified in the X direction by lens 20 so that its view is substantially coincident with the length of light footprint 24 (see FIG. 2). Thus, the end cells of array 27 receive light that is reflected from the undersides 51, 52 of the opaque scanner housing portions which are adjacent to the Y direction sides of transparent platen 12 (see FIG. 5).

In FIG. 2, a typical image scan line 24 (also see FIG. 1), comprising an exemplary 3,684 X direction PEL length (the individual cells are numbered from 0 to 3,683 hereafter), is optically reduced in length as it passes through lens 20 in a predetermined ratio (e.g., 7.5:1) before reaching light sensor 21 and CCD array 27. The analog signal content of CCD array 27 is periodically read out, document line by document line, as motor 18 moves carriage 15 in the Y direction along the length of platen 12.

When a document scan has been completed, carriage 15 returns to a home position (which is the rightmost position which carriage 15 can assume in FIG. 1) and stops with light footprint 24 positioned upstream of the leading edge 57 of platen 12 (i.e., to the right of the position of footprint 24 as shown in FIG. 1, and within leading edge portion 13 in FIG. 5).

The output scan signals from light sensor 21 are coupled through flexible cable 19 (FIG. 1) to electronic controller 22 after conversion of the output signals to digital form as is described below in connection with FIG. 3. Controller 22 provides drive signals to carriage motor 18. Controller 22 operates to move carriage 15 in an open loop fashion, and receives carriage position feedback from home sensor 59 as the carriage 15 returns to its home position. However, the invention may also be employed in a scanner in which controller 22 operates in a closed loop manner as it receives position or movement feedback information relative to carriage 15, such as from the output of a tachometer position detector 23. Controller 22 incorporates data processing and handling elements for exchanging data and signals with a remote host or processor 45 (FIG. 4) by way of cable 14 (shown in FIG. 4 as comprising input cable 43 and output cable 44). The operation of controller 22 is described in greater detail in conjunction with FIG. 4, infra.

FIG. 3 illustrates an embodiment for reading out the data content of light sensor 21. By means of gating signals (not shown), typically from controller 22, the analog signal content of every other detector cell 28 in CCD array 27 is coupled in parallel to analog shift register 25, while the signals present in the remaining cells 28 are coupled in parallel to analog shift register 26.

The analog signals loaded into registers 25 and 26 are representative of the various reflected light levels that are received from the individual PELS of light footprint 24, as these light levels are received by the like number of individual cells 28 of CCD array 27. The individual analog magnitudes correspond to the average of the light that is reflected from a small incremental pixel or PEL of light footprint 24 over a predetermined period of time. After these signals are transferred into registers 25 and 26, the signals are shifted serially through multiplexer 29 into analog to digital (A/D) converter 30. A variety of appropriate analog to digital converters are commercially available for this purpose.

Output 31 of A/D converter 30 comprises a sequence of bytes of data, for example, one byte of grey scale data for each PEL. Each of these bytes corresponds digitally to the magnitude of a discrete one of the analog signals retrieved from shift registers 25 and 26, and thus each byte corresponds to the magnitude of reflected light present at one of the cells 28 of CCD array 27. If array 27 images 300 cells or PELS per inch, output 31 of A/D converter 30 comprises a similar 300 bytes per inch.

As will be appreciated by those skilled in the art, the magnified length of array 27 (as shown in FIG. 2, the actual length of array 21 is magnified to be substantially equal to the length of light footprint 24) spans a distance that is greater than the corresponding transparent width of platen 12, as shown in FIG. 5. As a result, and as will later be described in greater detail, it is desirable for the logic and control of scanner 10 to be able to disregard the output of certain end cells 28 of array 27 that are not positioned so as to view light that is reflected from the transparent platen 12, or from a smaller predefined internal window area within a document 11 that is positioned on platen 12.

In addition, for the majority of the cells 28 that in fact are positioned to view transparent platen 12, or to view a predefined window area 62 (FIG. 5) within the platen 12, it is desirable to disregard the output of these cells until light footprint 24 reaches the leading edge 60 of the platen 12, or the leading edge 61 of the scan window 62.

As will become apparent, a document scanner 10 constructed in accordance with the invention provides a platen 12 abutted to an opaque leading edge portion 13 and an orthogonal opaque side edge portion 52, which two edge portions 13, 52 define a transparent leading edge corner (or document referencing corner) 58 (FIG. 5) of the platen 12 at which document 11 is corner referenced for scanning. Moving light footprint 24 operates to first illuminate-scan the opaque leading edge portion 13, and to thereafter illuminate-scan the above mentioned opaque side edge portion 52 and transparent platen 12. As a result, during the initial portion of a scan operation, a reflected light footprint is provided to array 27 that comprises light reflected from leading edge portion 13.

In accordance with the invention, one or more reflection targets (i.e., 54, 68 of FIGS. 5–7; 74, 75, 76 of FIG. 9) are positioned on the underside of the reference surface comprising opaque leading edge portion 13, opaque side portion 51 and/or opaque side portion 52. Each reflection target 54, 68 is positioned at a location which is exactly known relative to the above mentioned document referencing corner 58 and/or platen 12. As some or all of the reference surface is scanned (possibly including all or portions of the platen 12), the output of cells 28 is interrogated in order to logically locate the reflection targets 54, 68, or reference marks embodied therein, relative to the individual cells 28 of array 27, and relative to light footprint 24 and the servomechanism elements that operate to move footprint 24. Once the locations of the reflection targets are determined, the scanner's control logic is initialized to operate, as will be described, to (1) receive the output of only those cells 28 that view document 11, or a predefined window 62 within document 11, and to (2) activate those cells to scan document 11, or a window 62 within document 11, only when light footprint 24 has in fact reached the leading edge 60 of document 11, or the leading edge 61 of a window 62 within document 11, and (3) correct for skew of the platen's 12 leading edge 57 with respect to sensor array 27, light sensor 21 and light footprint 24, and lack of orthogonality of the platen 12 with respect to the direction of travel of carriage 15.

Since the physical locations of the one or more reflection targets 54, 68 are accurately known relative to the above mentioned document referencing corner 58 and/or platen 12, determining the locations of the reflection targets 54, 68 prior to actually beginning a document scan, and specifically, determining the locations of multiple reference marks embodied in the one or more reflection targets 54, 68, enables a determination to thereafter be made on a scan line by scan line basis as to which individual cells 28 will in fact operate to sense a document 11 that is corner referenced on platen 12 (or which cells 28 will operate to sense a window 62 within the document 11, the location of which can be extrapolated from the location of document referencing corner 58).

As a result of this new and unusual manner of determining the orientation of platen 12 with respect to array 27 and light footprint 24, document scanner 10 is initialized to operate accurately utilizing only the cells 28 which sense light reflected from an image on a document 11 being scanned.

Figure 4:
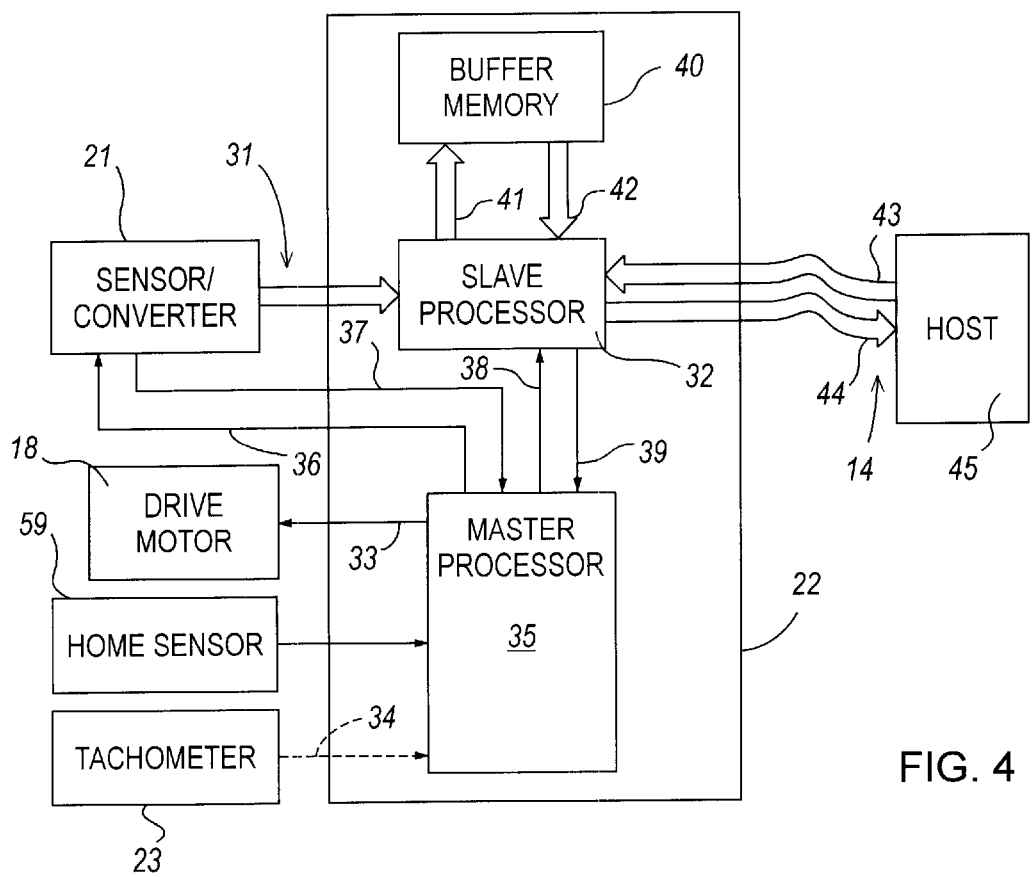
FIG. 4 is a block diagram showing the organization and arrangement of processor controlled logic and circuitry that is incorporated in the scanner of FIG. 1.

Prior to describing FIGS. 5–9 in detail, the general organization of the major electrical and electronic elements associated with the scanning of a full document 11 or a document window 62 will be described with reference to FIG. 4.

In a manner well known to those skilled in the art, master central processing unit (CPU) 35 controls movement of carriage 15 (FIG. 1) by way of appropriate activation signals on line 33 to motor 18 in conjunction with the output of a carriage home position sensor 59. Home sensor 59 may, for example, comprise a stationary light beam that is momentarily broken by a flag mounted on carriage 15 as the carriage moves in the homing direction toward the home position 63 shown in FIG. 5.

If desired, closed loop control of carriage motion may be provided in conjunction with a carriage position feedback signal that is provided by carriage position tachometer 23 on line 34.

In addition, master CPU 35 turns on and off the CCD cell sampling, and the analog-to-digital conversion of the cell contents of light sensor 21, via a two-way control signal dialog that is conducted on lines 36 and 37.

The digital byte data that is provided by the output of light sensor 21 (i.e. the output of A/D converter 30 of FIG. 3) is presented in parallel to slave processor 32 by way of bus 31. Processor 32 inserts the bytes of data into storage locations in buffer memory 40 by way of cable 41. Slave processor 32 receives and stores the data in response to initiating commands that are received from master CPU 35 via line 38, and continuously informs CPU 35 of its status and operation by way of line 39.

Slave processor 32 is also in two-way communication with an exemplary remotely located host data handling unit 45 via communication links 43 and 44 (which together make up cable 14 shown in FIG. 1). While parallel bit, multiple line cables provide interface 43, 44 between host 45 and slave processor 36, a variety of alternate data transmission disciplines are also available for this purpose, including means such as modems, fiber optic communications, etc.

Buffer memory 40 may comprise a table having a sequence of data storage locations. Typically, but without limitation thereto, memory 40 does not provide enough data storage to hold all of the data that is derived from scanning an entire document 11, or a relatively large window 62 within the document 11.

As a byte of data is received from light sensor 21 over cable 31 (cable 19 in FIG. 1), the data is inserted into the next available sequential storage location within buffer memory 40. When host 45 notifies slave processor 32 that it is ready to receive data, processor 32 begins transmitting the data then resident in memory 40 to host 45 over link 44. Processor 32 concurrently handles the entry of data into memory 40 from cable 31, and the transmission of data from memory 40 to host 45. The transmission of data to and from memory 40 is such that memory 40 is loaded and unloaded on a recycling first in, first out (FIFO) basis. Typically, processor 32 is loading data in an upstream storage location of memory 40 at the same time that data is being extracted from a downstream memory location for transfer to host 45.

As long as host 45 operates to request data from processor 36 as fast as, or no faster than, data is inserted into memory 40, the system proceeds smoothly until data corresponding to the entire document 11 or document window 62 has been scanned and transmitted.

Processor 32 notifies CPU 35 whenever host 45 fails to request data from memory 40 fast enough to prevent the last available storage location of memory 40 from becoming loaded with data (i.e., a memory-full condition).

When this memory-full condition is indicated by processor 32, CPU 35 notes the location of carriage 15 and line of light 24 at which the memory-full event occurred, and CPU 35 operates to stop drive motor 18. CPU 35 then reverses drive motor 18 and returns carriage 15 to a position that is upstream of the noted memory-full location. Carriage 15 remains at this upstream position until host 45 again begins to request data from memory 40.

When CPU 35 determines that processor 32 can again load data into memory 40, scan movement is reinitiated. In each case of a memory-full start/stop sequence, the upstream stop position is selected such that carriage 15 will be at full scan velocity as it again reaches the downstream memory-full position, whereupon document scanning is reinitiated under the control of line 36.

The above described stop/start scan sequence repeats each time that a memory-full condition is detected for memory 40. Eventually, the complete data content of document 11, or of a window within the document, will be loaded into memory 40, and will be transferred over communication link 44 to host 45.

With reference to FIG. 5, when the scanner 10 is not in use, carriage 15 is parked at a home or stop position that is defined by reference numeral 63.

Stop position 63 may not be well defined relative to the physical positions/locations of targets 54 and 68. This is due to the inexact and variable physical relationship that exists between home sensor 59 and targets 54, 68, as is evident from viewing FIG. 1, and as will be appreciated by those skilled in the art. However, the Y direction distance between stop position 63 and the location of at least one of targets 54, 68 is preferably quite small. In fact, stop position 63 might even intersect one or more of targets 54 and 68.

Figure 7:
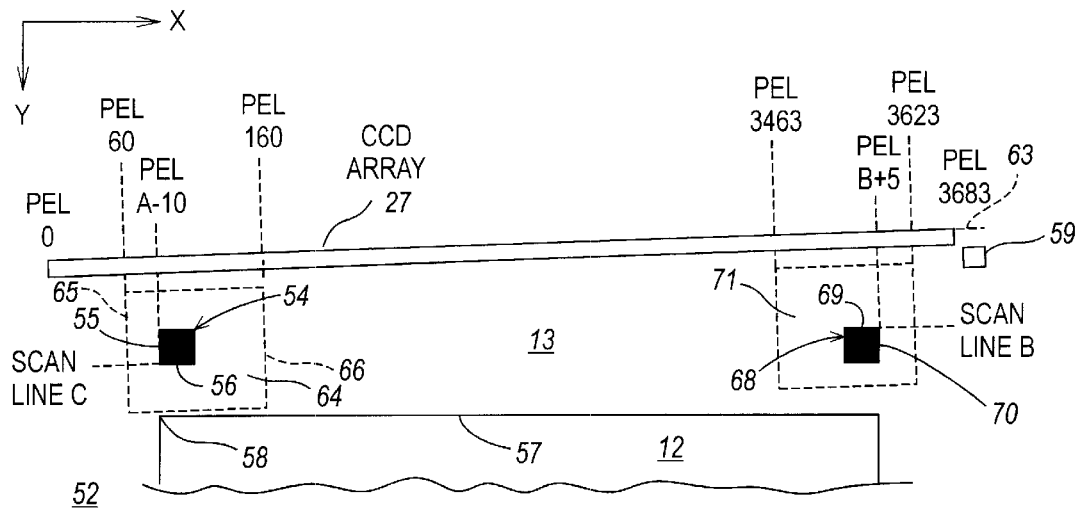
FIG. 7 is a view similar to FIG. 6, wherein the light footprint is skewed with respect to the platen.

When motor 18 begins a document scan operation, targets 54 and 68 are encountered early in the scan movement. As a result of scanning target area 54, a PEL map such as is shown in FIG. 7 is loaded into memory 40.

FIG. 5 is a bottom view of the document platen 12 shown in FIG. 1. As is seen in this figure, transparent platen 12 is rectangular in shape, and is edge-supported or mounted by an encircling opaque scanner housing 50. The support portions of this housing comprise the above mentioned leading edge portion 13, two orthogonal side edge portions 51 and 52, and a trailing edge portion 53. These identified portions of the scanner housing 50 will be referred to herein, both individually and/or in various combinations, as the reference surface abutting platen 12.

In a first preferred embodiment of the invention, but without limitation thereto, the underside of the reference surface (i.e., the side on which the light footprint 24 shines) is a highly reflective color such as white or light grey. The reference surface supports or mounts two 20 PEL by 20 PEL black reflection targets 54, 68, each having an X direction edge 55, 70 and a Y direction edge 56, 69. In alternative embodiments of the invention, the targets 54, 68 may be formed from indentations (e.g., holes or recesses) that are formed in the reference surface so as to appear black to the scanner's optical system, or raised portions that are formed on the reference surface so as to generate a fine shadow which appears black to the scanner's optical system.

The reflection targets 54, 68 are preferably located on housing portion 13 in close proximity to the leading edge 57 of platen 12 (the exact distance is not critical), this leading edge 57 being coincident with the leading edge of a document 11, shown in broken lines.

During manufacture of the platen 12 of a document scanner 10, reflection target edges 55, 56, 69 and 70 are accurately located or positioned relative to an X-Y coordinate system that is defined by the platen's document referencing corner 58. However, it is within the scope of the invention that the target edges 55, 56, 69, 70 be located with respect to an alternate coordinate system, so long as the alternate coordinate system is referenced in some way to the platen 12. For the purpose of this description, platen corner 58 is considered to be the X=0,Y=0 PEL area of an X-Y coordinate system. The rows of the coordinate system extend in the X direction, each row being coincident with a document scan line. The columns of the coordinate system extend in the Y direction, perpendicular to the direction of travel of carriage 15 (FIG. 1). An exemplary scan resolution is 300 rows per Y direction inch and 300 columns per X direction inch.

Note that in FIG. 5, the effective X direction length of CCD array 27 is somewhat longer that the width of platen 12. In practice, array 27 is physically quite short, and the longer effective length shown in FIG. 5 is established by the optical system shown in FIGS. 1 and 2. Also note that in FIG. 5, CCD array 27 is defined as having 3,684 individual sensor cells, designated from cell 0 to cell 3,683. In this figure CCD array 27 and light footprint 24 are synonymous, and are shown positioned at a stop position 63 that is just upstream of home sensor 59.

The resolution of CCD array 27 is of an exemplary 300 PELS or cells (i.e., cells 28 of FIG. 3) per inch. Thus, the row by row scanning of an entire 8½ inch wide document 11 will utilize only 3,400 of the 3,634 array cells. The scanning of a window 62 within the body of document 11 will utilize a smaller number of cells 28. Operation of the invention provides an accurate determination of just which cells to use in either case.

FIG. 5 shows two Y direction beginning scan positions, defined as 60 and 61. Position 60 is used for the scanning of an entire document 11, or for the scanning of a window (not shown) within document 11 whose leading edge is coincident with the platen's leading edge. Position 61 is used for the scanning of a predefined window 62 within document 11 (or within platen 12).

The position of the PEL areas of document 11 to be scanned, or of a window 62 within document 11, are all referenced to the X-Y coordinate system that is established by document referencing corner 58.

The invention utilizes the unitary construction of platen leading edge portion 13 of the scanner housing to form both corner reference 58 for document 11, and targets 54, 68. In this manner, it is not only possible to locate corner reference 58 with respect to other more remotely located operative elements of the scanner 10, such as sensor array 21 and home sensor 59 (as taught in Stein, et al.), but it is also possible to determine the orientation of platen 12 with respect to these remotely located elements.

Since the position of targets 54 and 68 are accurately known relative to referencing corner 58 (or platen 12), the sensing of targets 54, 68 during the initial portion of a document scan is utilized to provide for activation of CCD array 27, both in the X and the Y direction, so as to accurately scan document 11, or to accurately scan a window area 62 within document 11. Alternately, all cells 28 of CCD array 27 can be activated for an entire scan, and firmware, software or the like can discard or ignore data generated by the CCD array 27 which falls outside the boundaries of a document 11 or window area 62 within a document 11.

As the leading edge portion 13 of platen 12 is scanned, the outputs of sensor cells 28 are interrogated in order to (1) determine the location of reflection targets 54, 68 relative to the individual cells 28 of array 27, and (2) locate the physical position of reflection targets 54, 68 relative to the movement of carriage 15 beyond home sensor 59 and stop position 63. Once the position of a reflection target 54 is known, the scanner's control logic operates to (1) receive the output of only those sensor cells 28 that view the transparent platen 12, or a smaller window within the platen, on a scan line by scan line basis, and to (2) activate those cells 28 to scan document 11, or a window within document 11, only when light footprint 24 has in fact reached the leading edge of document 11, or the window within the document.

Since the physical locations of reflection targets 54, 68 are accurately known relative to document referencing corner 58, a determination of two first groups of individual cells 28 that operate to sense the targets 54, 68 prior to actually beginning a document or window scan enables a determination to thereafter be made on a scan line by scan line basis as to second groups of individual cells 28 that in fact will operate to sense a document 11 that is corner referenced on platen 12, or to sense a window 62 within the document 11.

As a result of this new and unusual manner of determining the physical location and orientation of the X-Y coordinate system that is defined by platen 12, document scanner 10 (1) accurately utilizes only the cells 28 that are within the above mentioned second groups of cells as a document that is corner referenced at platen 12 is scanned, and (2) begins using these second groups of cells when light footprint 24 is coincident with the leading edge of the document area that is to be scanned.

Figure 6:
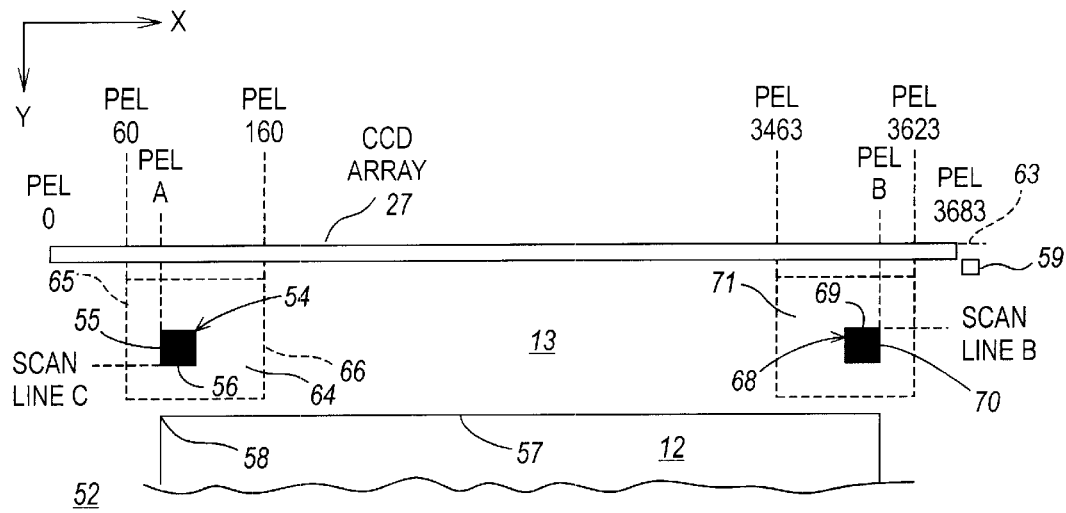
FIG. 6 is an enlarged view similar to FIG. 5, showing the reflection targets and their relationship to both the document referencing corner of the platen and the light footprint.

FIG. 6 is an enlarged view that is similar to FIG. 5 in showing targets 54 and 68, as well as platen 12, the platen's document referencing corner 58, CCD array 27, and home sensor 59. CCD array 27 is shown at rest at stop position 63.

Figure 8:
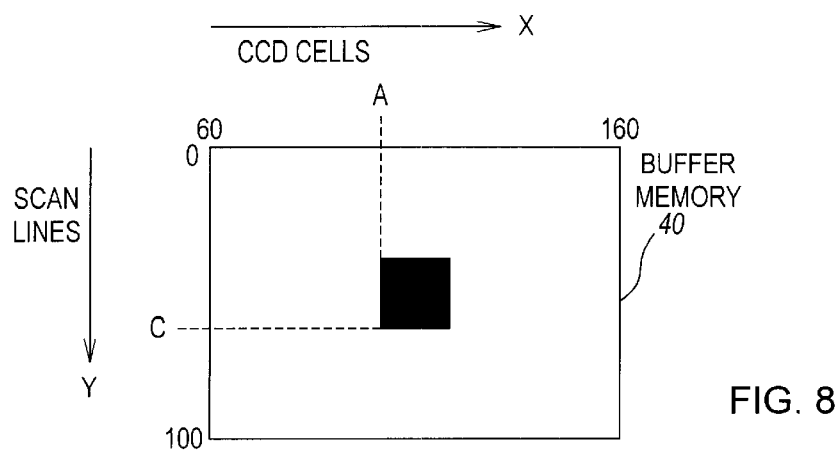
FIG. 8 shows part of a representative data content or PEL map that is stored in the buffer memory of FIG. 4 as a result of scanning the leftmost reflection target shown in FIG. 6.

Square dotted outlines 64 and 71 are exemplary 100×100 PEL areas of the platen's leading edge portion 13, each of which includes a 20×20 PEL area occupied by one of targets 54 or 68. The image content of PEL areas 64 and 71 may be stored in memory 40 of FIG. 4 as leading edge portion 13 is scanned. FIG. 8 shows the stored PEL map content of memory 40 which results from scanning area 64. Within the spirit and scope of the invention, any size PEL area of the platen's leading edge portion 13 can be scanned and stored, just so long as the scanned area(s) include targets 54 and 68, or enough of targets 54 and 68 that the location of one or more reference marks on each can be accurately determined. The identification of reference marks included within targets will be discussed below. If the two PEL areas 64 and 71 occupy a substantially common Y direction span, their areas may be scanned, and their images may be stored, at the same time.

While it is not critical to the invention, Y direction target edge 55 of target 54 may be positioned in exact physical alignment with the left hand edge of transparent platen 12. Likewise, the Y direction target edge 70 of target 68 may be positioned in exact physical alignment with the right hand edge of platen 12. Note that the right hand and left hand edges of platen 12 are referenced with respect to viewing platen 12, FIG. 1, from its underside.

As CCD array 27 is stepped by motor 18 in the Y direction, the image content of PEL areas 64 and 71 is stored in buffer memory 40. FIG. 8 illustrates the stored image content of PEL area 64. Note that sensor PEL 60 scans the left hand edge 65 of area 64, and sensor PEL 160 scans the right hand edge 66 of area 64. Readings from sensors located between PEL 60 and PEL 160 are stored in buffer memory 40, thus capturing an image of target 54. This stored image is used to make a determination that sensor PEL A is the sensor cell that is positioned to be substantially coincident with Y direction target edge 55.

A similar image of PEL area 71 is also stored in buffer memory 40. This image is used to determine that PEL B is the sensor cell that is positioned to be substantially coincident with Y direction target edge 70.

As a result of determining that PEL A is in substantial alignment with the left hand edge of platen 12 during the scanning of a document 11, and that PEL B is in substantial alignment with the right hand edge of platen 12, the cells of array 27 that are used to perform a full document scan when the platen's leading edge 57 is parallel to CCD array 27, and/or when the platen's side edges are orthogonal to the direction of travel of carriage 15, begin at cell A and end at cell B. Of course, during a window scan of document 11, the array cells to be used are determined with reference to the fact that cell A views the left hand edge of the platen 12.

In addition to functioning as above described, the images stored in buffer memory 40 can also be used to accurately determine when light footprint 24 reaches the leading edge of a document area to be scanned, be it a full page document scan 11, or the scan of a small window 62 within the body of a document 11.

This function is accomplished in a similar manner. However, in this case the content of memory 40 (FIG. 8) is used to determine that the scan line identified as SCAN LINE B in FIG. 6 is the scan line that is in substantial alignment with the leading X direction edge 69 of target 68. Since the position of target edge 69 is accurately known relative to the leading edge 57 and/or document referencing corner 58 of platen 12, continued scan movement of carriage 15 (i.e., movement to the left in FIG. 1) is monitored, as by counting the movement steps of stepping motor 18. When it is determined that light footprint 24 has arrived at the leading edge of the document area to be scanned, array 27 is activated to begin loading memory 40 with the image data content of this document area. Alternately, memory 40 can be loaded with all image data, regardless of whether it lies in a document area to be scanned, and firmware, software or the like located within scanner 10 or host 45 can utilize the relationship between the leading edge of target 68 and, for example, document referencing corner 58, to determine which pieces of the full image data should be ignored or discarded.

The location of platen leading edge 57 could also be determined in regard to the relationship between trailing edge 56 of target 54 and document referencing corner 58. The trailing edge 56 of target 54 coincides with SCAN LINE C in FIGS. 6 and 8.

So long as it is insured that CCD array 27, light footprint 24 and other remote scanning elements are squarely positioned with respect to the X-Y coordinate system defined by platen 12, the location and orientation of platen 12 can be accurately determined after scanning only one of targets 54 and 68. However, if CCD array 27, light footprint 24 or any other scanning element is skewed with respect to platen 12, or if carriage 15 travels in a direction which is not orthogonal to platen leading edge 57, the skew and/or non-orthogonality of scanning elements can only be determined after identifying multiple targets 54, 68 (or more generally, multiple reference marks) on the underside of a scanner's reference surface. As previously discussed, targets will typically be formed on, formed in, or attached to the underside of those portions 13, 51, 52, 53 of a scanner housing which can be illuminated by light footprint 24 and sensed by CCD array 27.

FIG. 7 assumes that CCD array 27 and light footprint 24 are skewed and/or travel non-orthogonally with respect to platen 12. Such a skew and/or non-orthogonality might be caused by a temperature change or perhaps a mechanical blow to the scanner 10. It is also possible that the scanner 10 was originally manufactured without optimum alignment being achieved due to the fact that the tolerances for optimum alignment were too difficult to achieve. The effective position of array 27 with respect to platen 12 is now at an angle. For this assumed condition, the sensor cell that is identified as PEL A-10 is in substantial alignment with the juncture of left hand edge 55 and trailing edge 56 of target 54 as CCD array 27 moves in the Y direction across this juncture. Note that the juncture, or reference mark, is still aligned with the left hand edge of platen 12.

As the CCD array 27 moves in the Y direction over the juncture of right hand edge 70 and leading edge 69 of target 68, the sensor cell that is identified as PEL B+5 is in substantial alignment with same, which juncture or reference mark is still aligned with the right hand edge of platen 12.

Note also in FIG. 7 that CCD array 27 now has a shorter distance to travel before reaching target 54, and a longer distance to travel before reaching target 68.

Because of (1) a known relation between scanned reference marks and platen 12, (2) a determination that more individual cells of CCD array 27 span a scan line in the vicinity of targets 54 and 68 than would span a similar scan line in the configuration shown in FIG. 6 (i.e., sensor cells which are roughly between sensor PEL A-10 and sensor PEL B+5), and (3) a determination that the document referencing corner 58 of platen 12 will be encountered by CCD array 27 before the opposite corner of the platen's leading edge 57 is encountered by CCD array 27, scanner 10 can make minor adjustments to account for the fact that CCD array 27 is skewed and/or traveling non-orthogonally with respect to platen 12. One such adjustment might be a scan line by scan line determination of which sensor cells 28 will acquire the data of a document 11 or document window 62 being scanned (i.e., a correction for non-orthogonal travel of CCD array 27). Another adjustment might be the acknowledgment that a first row of pixels in a document 11 which is squarely abutted to document referencing corner 58 will comprise PEL data acquired in multiple scan line readings of CCD array 27 (i.e., a correction for skew of the CCD array 27 with respect to platen edge 57). If both skew and non-orthogonal carriage travel are present, both of the above adjustments might be made. One skilled in the art will realize that additional adjustments may also be made, and that the adjustments may be made within or without scanner 10, and by firmware, software or the like.

Note that the two reference marks which have been identified in FIG. 7 are offset from each other in both the X and Y direction. Such an offset allows as few as two reference marks to be used to determine both orthogonality and skew factors. Typically, the greater the X and Y offsets of these two marks, the greater the accuracy with which skew and orthogonality can be determined. Also note that it is possible, although probably not very accurate, to determine skew and orthogonality from two reference marks on, for example, opposite corners of a single one of the FIG. 7 targets 54, 68. The problem with such a determination is that the X and Y offsets between the two marks would be small, and the optical accuracy and resolution of the scanner would become large factors in accurately determining skew and orthogonality from such marks.

Figure 9:
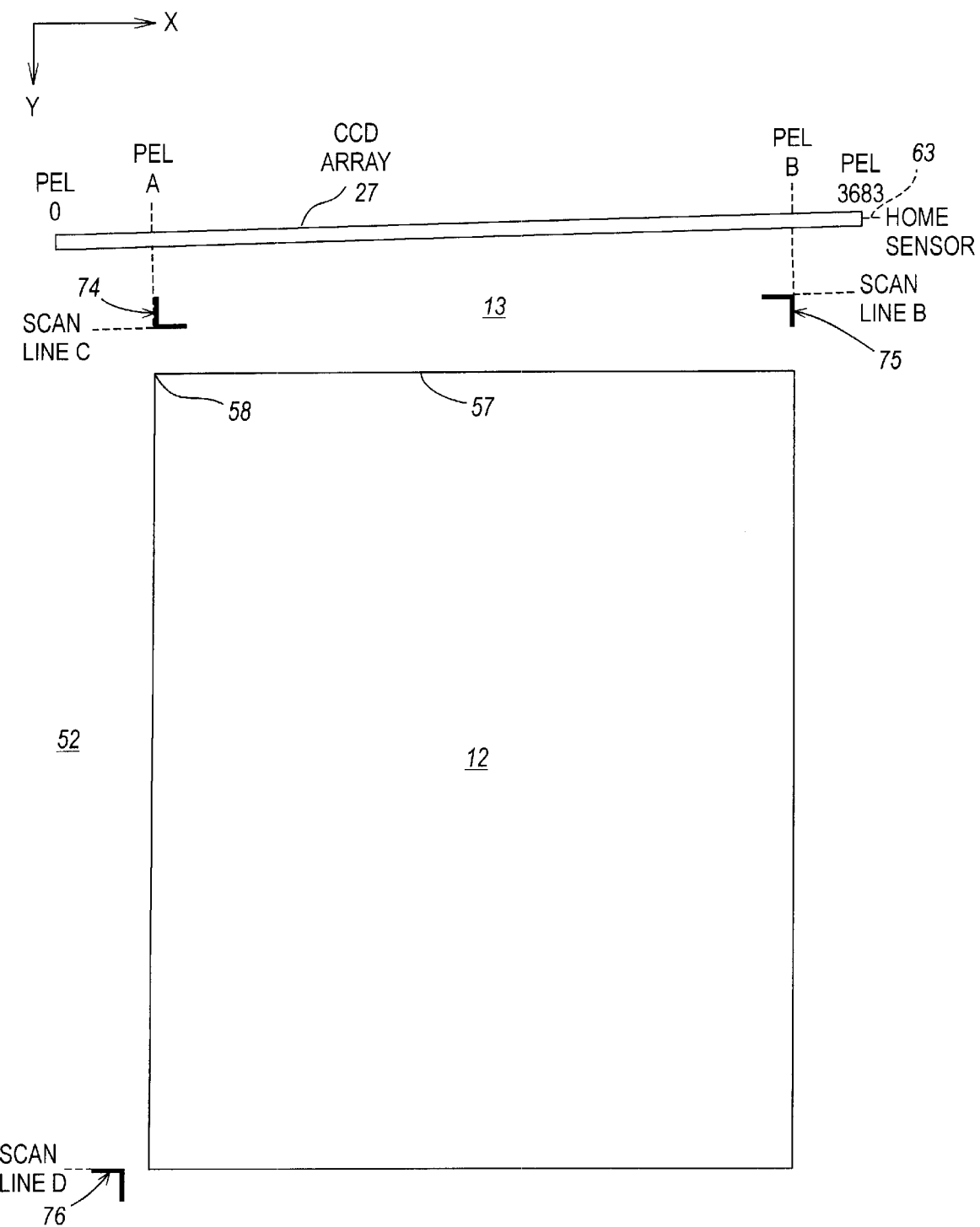
FIG. 9 shows an alternative arrangement of reflection targets and reference marks in accordance with the invention.

FIG. 9 illustrates an alternate embodiment of the invention, wherein three reflection targets 74, 75, 76 are located in close proximity to three different corners of platen 12. Two are located in leading edge portion 13, and one is located in side edge portion 52. Each of the reflection targets comprises an indentation in, or raised portion on, the underside of a scanner's housing. Three reference marks are embodied in the three reflection targets 74, 75, 76, each reference mark being located at the intersection of an X direction edge and a Y direction edge of a different one of the targets 74, 75, 76. As in FIG. 6, one will note that CCD array 27 is skewed with respect to platen 12 in FIG. 9. Advantages of scanning the three reflection targets 74, 75, 76 shown in FIG. 9, and then determining the coordinate locations of three reference marks, include (1) the introduction of greater Y offset between the reference marks so as to increase the accuracy of skew and orthogonality determinations, and (2) the introduction of a cross-checking ability, whereby skew and orthogonality can be calculated with respect to different sets of reference marks, and averaging can be performed to determine a "best fit" skew and orthogonality estimation.

During the scanning of a document, the content of buffer memory 40 is transmitted to host 45. However, and without limitation thereto, during initialization of a document scanner 10 in accordance with the invention, the FIG. 8 content of buffer memory 40 is preferably maintained within the electronics of the scanner 10 itself.

During the scanning of a document, the output 31 (FIG. 4) of sensor/converter 21 may comprise many binary magnitude levels of byte or multibyte data spanning a range from byte 00000000 to byte 11111111, for example, as might be generated by scanning a document area having a white background and various levels of grey scale image. However, and without limitation thereto, during the initialization of a scanner 10 in accordance with the invention, the output of sensor/convertor 21 is preferably subjected to a threshold detection procedure by slave processor 32 of FIG. 4 to insure that only two levels of binary output are provided to memory 40. With reference to FIGS. 6–8, the only two outputs that are provided to buffer memory 40 during initialization are a large magnitude byte such as 01010111 for all PELS within the generally white areas surrounding targets 54 and 68, and a lower magnitude byte such as 00011111 for all areas within targets 54 and 68.

In addition, but without limitation thereto, it is preferable that in order to "find" the targets 54, 68 and reference marks within the data stored in memory 40, a row and column averaging procedure be used, since the stored data content of memory 40 may not define targets 54 and 68 as ideally as is shown in FIG. 8.

As stated previously, the physical positions of targets 54 and 68 relative to platen 12 and document referencing corner 58 are not critical to the invention, so long as the coordinate locations of their positions with respect to platen 12 or document referencing corner 58 are known. For example, targets can be located at virtually any known position prior to the platen's leading edge 57, or within side portions 51 and 52, that is within the viewing area of CCD array 27. It is however advantageous that the Y direction edge 55 of a target be positioned in exact mechanical alignment with the left hand edge of the transparent portion of platen 12. For example, target 54 could be located to the left of the left hand platen edge, rather than to the right thereof as is shown in FIG. 6.

Figure 10:
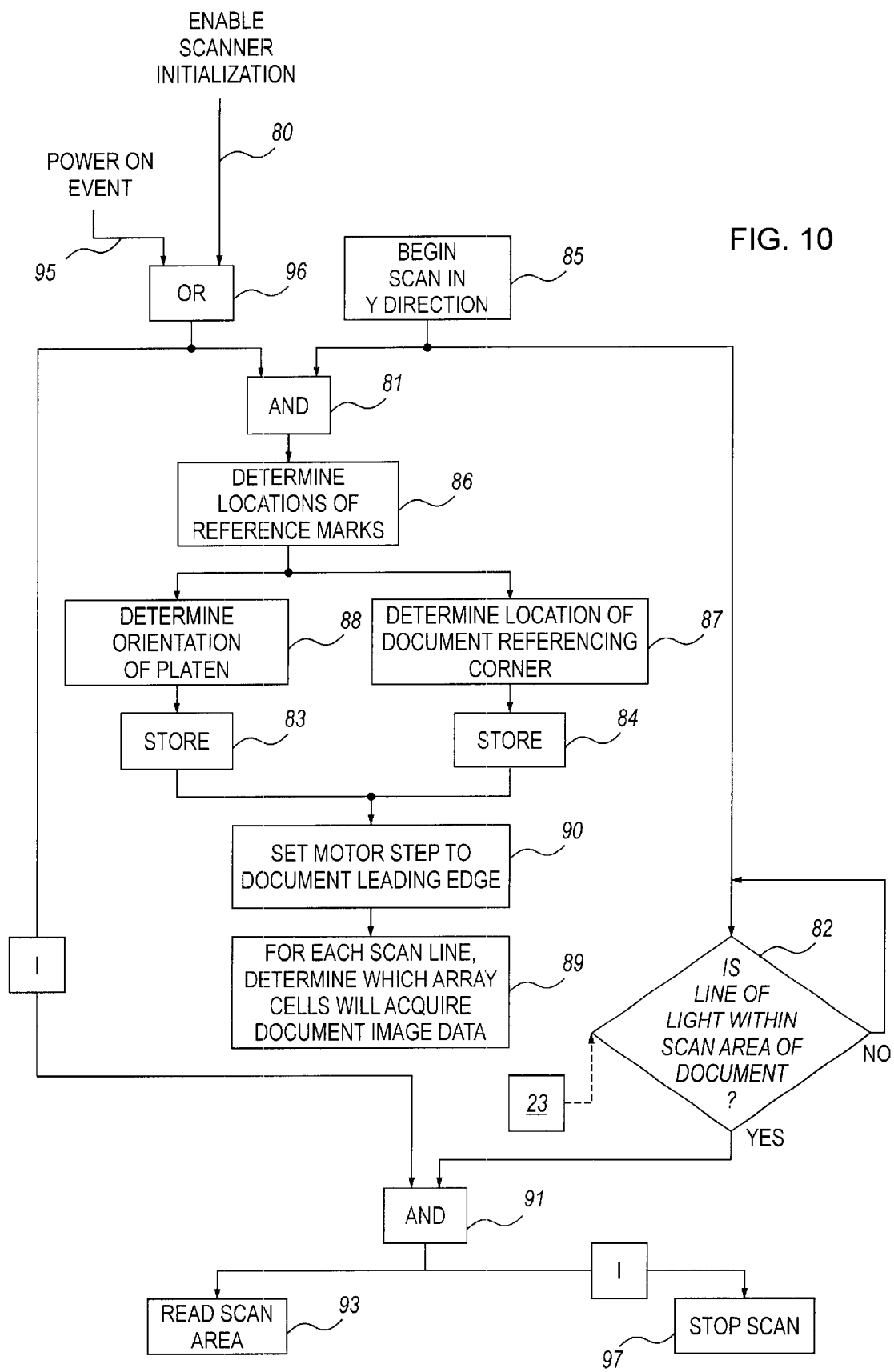
FIG. 10 discloses an embodiment of the invention in method form.

FIG. 10 will now be referenced in order to describe further embodiments of the invention. As stated previously, scanner 10 is periodically initialized, for example at initial power-on at the beginning of a work day as a result of an active signal being present on conductor 95, or periodically at later times and on command as a result of an active signal being present on conductor 80.

Consider first the situation where the signals on conductors 80 and 95 are both inactive at the time that a scan request 85 is received. In this case, AND gate 81 remains disabled, and decision block 82 operates to monitor the position of the moving light footprint 24, for example by way of the open loop counting of the movement steps of stepping motor 18, or as may be provided in a closed loop fashion by the output of feedback transducer 23.

So long as light footprint 24 is within the area of the document that is to be scanned, AND gate 91 is enabled and operates to read the document's scan area by operation of function block 93. Reading function 93 is accomplished by activating the individual sensor cells 28 as are indicated by (1) the operation of memory store block 83 (to be described) and (2) the location of the document scan area relative to document referencing corner 58 (FIG. 5), 84.

The distance from the position of home sensor 59 in FIGS. 5–9 (i.e., the position at which motor 18 stops and then restarts to begin the scan toward document/platen leading edge 57) is stored in memory by operation of function block 84. If the above assumed scan operation is a full document scan, function block 93 is activated after this distance of movement by motor 18. If the above assumed scan operation is a window scan, the distance of movement by motor 18 is related to this memory content distance plus the distance from document/platen leading edge 57 to the leading edge of the document's window, this later parameter being defined by the user, by an application program that is currently being executed, by host 45, or by the like.

Assume now that an active signal is present on either of the conductors 80 or 95, indicating the occurrence of an initial power-on event 95 such as may occur at the beginning of a work day, or indicating that a request 80 has been received to re-initialize the scanner at a later time during the work day. Either of these events 80, 95 causes function block 85 to become active. At this time, function block 85 becomes active not for the purpose of scanning a document, but rather for the purpose of scanning reflection targets 54, 68 and associated reference marks (FIGS. 5–8) in accordance with the invention.

As a result of the occurrence of either of the events 95 or 80, OR gate 96 issues an active signal to AND gate 81. AND gate 81 also receives an active signal at this time from function block 85. The resulting active output from AND gate 81 indicates (1) that the scanner is to be initialized, and (2) that a scan operation is beginning during which the initialization is to occur.

An active output from AND gate 81 operates to enable function block 86 to perform the sensing of the reference marks embodied in targets 54 and 68 (i.e., by sensing the position of target edges 56, 55, 70 and 69, respectively) as above described.

As a result of the operation of function block 86, calculations 87, 88 are first performed to determine the location of document referencing corner 58 and the orientation of platen 12. A calculation 83 is then performed to determine on a scan line by scan line basis exactly which of the 3,634 sensor cells within CCD array 27 are positioned to be coincident with the width of platen 12.

In addition, function block 90 operates to set the distance that motor 18 must move carriage 15 from stop position 63 in FIGS. 5-7 in order to bring light footprint 24 into coincidence with the leading edge 57 of the platen/document.

As will be remembered, the distance from target edge 56 to the leading edge 57 of platen 12 is a known distance. However, the location of edge 57, using the various mechanical and electrical components of scanner 10, cannot be accurately determined based upon the physical position of home sensor 59 (FIG. 1), which corresponds to the stop position labeled home sensor 63 in FIGS. 5 and 6, since, as will be appreciated by those of skill in the art, the mechanical position of home sensor 59 relative to leading edge 57 is clearly subject to variation, as with temperature change, jarring of the scanner, manufacturing tolerances, and the like.

As is apparent from FIG. 10, during the above described initialization of the scanner, as is indicated by an active output signal from OR gate 96, AND gate 91 is maintained disabled. As a result, function block 97 operates to stop scan movement 85 after the operation of store functions 83 and 84, and to return the scan carriage to its stop position, where the scan carriage awaits a later request to scan a document. This later request to scan a document will be indicated by function block 85 being active in the absence of an active output from OR gate 96.

While the preferred embodiment of the invention shown in FIG. 9 provides for an initialization scan of targets 54 and 68 that is separate from document scans, it is within the spirit and scope of the invention that a scanner might be periodically initialized, for example on power-on, or at a later time on command, and that the initialization may occur as the beginning portion of a document scan request.

In such an embodiment of the invention, after the mechanical position of the platen's document referencing corner 58 (FIGS. 5–7) has been "found" relative to the position of array 27 and relative to the position of home sensor 59, and after these parameters have been stored in memory, decision block 82 operates to monitor the position of motor 18 (i.e., the position of light footprint 24) in order to determine when the light footprint is within a requested document scan area. When a full document scan has been requested, function block 93 operates to activate the appropriate sensor cells 28 when the leading edge of the platen 12 is encountered by the light footprint. When a window of a document is to be scanned, the sensor cells 28 to be activated by function block 93 are based upon the position of the scan window within the document.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for determining an orientation of a platen with respect to a sensor array in a document scanner having:

a platen with a document referencing comer, said document referencing corner being established by first and second axes having a known relation to said platen; a reference surface abutting said platen, said reference surface having multiple reference marks on an underside thereof, and said multiple reference marks being in known coordinate locations with respect to said first and second axes; a light source for illuminating said platen and at least a portion of said reference surface; a sensor array for acquiring an image of documents placed on said platen, as well as an image of the underside of said reference surface, when said light source is illuminating portions of said images to be acquired; and a processor;

the method comprising:
   a) said sensor array acquiring said image of the underside of said reference surface;
   b) said processor determining from said image of the underside of said reference surface a coordinate location of each of said multiple reference marks; and
   c) said processor determining from said determined coordinate locations of said multiple reference marks, and said known coordinate locations of said multiple reference marks with respect to said first and second axes, said orientation of said platen with respect to said sensor array.

2. A method as in claim 1, wherein:
   a) said sensor array is a linear sensor array which is designed to extend substantially parallel to, and travel substantially perpendicular to, said first axis when acquiring said images;

b) at least two of said multiple reference marks have differing coordinates along said first axis; and c) said processor's determination of said orientation of said platen with respect to said sensor array comprises determining from said determined coordinate locations of said at least two reference marks, and said known coordinate locations of said at least two reference marks with respect to said first and second axes, a skew of said first axis with respect to the extension of said sensor array.

3. A method as in claim 1, wherein:

a) said sensor array is a linear sensor array which is designed to extend substantially perpendicular to, and travel substantially parallel to, said second axis when acquiring said images;

b) at least two of said multiple reference marks have differing coordinates along said second axis; and c) said processor's determination of said orientation of said platen with respect to said sensor array comprises determining from said determined coordinate locations of said at least two reference marks, and said known coordinate locations of said at least two reference marks with respect to said first and second axes, the orthogonality of said platen with respect to the travel of said sensor array.

4. A method as in claim 1, wherein:

a) said platen is rectangular in shape;

b) said first axis is parallel to a leading edge of said platen, and said second axis is parallel to a side edge of said platen, said leading edge and said side edge forming a 90° angle;

c) said sensor array is a linear sensor array which is designed to extend substantially parallel to said leading edge, and travel substantially perpendicular to said leading edge, when acquiring said images;

d) at least two of said multiple reference marks have differing coordinates along said first axis, and at least two of said multiple reference marks have differing coordinates along said second axis; and e) said processor's determination of said orientation of said plate n with respect to said sensor array comprises determining from said determined coordinate locations of said multiple reference marks, and said known coordinate locations of s aid multiple reference marks with respect to said first and second axes, a skew of the leading edge of said platen with respect to the extension of said sensor array.

5. A method as in claim 4, wherein said processor's determination of said orientation of said platen with respect to said sensor array further comprises:

a) determining from said determined coordinate locations of said multiple reference marks, and said known coordinate locations of said multiple reference marks with respect to said first and second axes, the orthogonality of said platen with respect to the travel of said sensor array; and b) estimating from said skew and orthogonality determinations an orientation of said platen with respect to said sensor array.

6. A method as in claim 1, wherein:

a) said platen is rectangular in shape;

b) said first axis is parallel to a leading edge of said platen, and said second axis is parallel to a side edge of said platen, said leading edge and said side edge forming a 90° angle;

c) said sensor array is a linear sensor array which is designed to extend substantially parallel to said leading edge, and travel substantially perpendicular to said leading edge, when acquiring said images;

d) at least two of said multiple reference marks have differing coordinates along said first axis, and at least two of said multiple reference marks have differing coordinates along said second axis; and e) said processor's determination of said orientation of said platen as seen by said sensor array comprises determining from said determined coordinate locations of said multiple reference marks, and said known coordinate locations of said multiple reference marks with respect to said first and second axes, the orthogonality of said platen with respect to the travel of said sensor array.

7. A method as in claim 1, wherein:

a) at least one of said multiple reference marks is embodied in an indentation in the underside of said reference surface; and b) said processor's determination of a coordinate location of each of said multiple reference marks from said image of the underside of said reference surface comprises detecting a representation of said indentation in said image of the underside of said reference surface, and then determining a coordinate location for said representation of said indentation.

8. A method as in claim 1, wherein:

a) at least one of said multiple reference marks is embodied in a raised portion of the underside of said reference surface; and b) said processor's determination of a coordinate location of each of said multiple reference marks from said image of the underside of said reference surface comprises detecting a representation of said raised portion in said image of the underside of said reference surface, and then determining a coordinate location for said raised portion.

9. A method as in claim 1, wherein:

a) at least one of said multiple reference marks is embodied in a contrasting color portion of the underside of said reference surface; and b) said processor's determination of a coordinate location of each of said multiple reference marks from said image of the underside of said reference surface comprises detecting a representation of said contrasting color portion in said image of the underside of said reference surface, and then determining a coordinate location for said contrasting color portion.

10. A method as in claim 1, wherein:

a) at least one of said multiple reference marks is embodied in a shaped element which is attached to the underside of said reference surface; and b) said processor's determination of a coordinate location of each of said multiple reference marks from said image of the underside of said reference surface comprises detecting a representation of said shaped element in said image of the underside of said reference surface, and then determining a coordinate location for said shaped element.

11. A method as in claim 1, wherein for at least one of said multiple reference marks, said processor's determination of a coordinate location of said at least one reference mark from said image of the underside of said reference surface comprises determining a coordinate location for an intersection of two edges in said image of the underside of said reference surface.

12. A document scanner, comprising:
   a) a platen with a document referencing corner, said document referencing corner being established by first and second axes having a known relation to said platen;
   b) a reference surface abutting said platen, said reference surface having multiple reference marks on an underside thereof, and said multiple reference marks being in known coordinate locations with respect to said first and second axes;
   c) a light source for illuminating said platen and at least a portion of said reference surface;
   d) a sensor array for acquiring an image of items placed on said platen, as well as an image of the underside of said reference surface, when said light source is illuminating portions of said images to be acquired; and
   e) a processor, said processor comprising logic for:
      i) initiating said sensor array's acquisition of said image of the underside of said reference surface;
      ii) determining from said image of the underside of said reference surface a coordinate location of each of said multiple reference marks; and
      iii) determining from said determined coordinate locations of said multiple reference marks, and said known coordinate locations of said multiple reference marks with respect to said first and second axes, said orientation of said platen with respect to said sensor array.

13. A document scanner as in claim 12, wherein:
   a) said sensor array is a linear sensor array which is designed to extend substantially parallel to, and travel substantially perpendicular to, said first axis when acquiring said images;
   b) at least two of said multiple reference marks have differing coordinates along said first axis; and
   c) said processor logic determines said orientation of said platen with respect to said sensor array by determining from said determined coordinate locations of said at least two reference marks, and said known coordinate locations of said at least two reference marks with respect to said first and second axes, a skew of said first axis with respect to the extension of said sensor array.

14. A document scanner as in claim 12, wherein:
   a) said sensor array is a linear sensor array which is designed to extend substantially perpendicular to, and travel substantially parallel to, said second axis when acquiring said images;
   b) at least two of said multiple reference marks have differing coordinates along said second axis; and
   c) said processor logic determines said orientation of said platen with respect to said sensor array by determining from said determined coordinate locations of said at least two reference marks, and said known coordinate locations of said at least two reference marks with respect to said first and second axes, the orthogonality of said platen with respect to the travel of said sensor array.

15. A document scanner, comprising:
   a) a rectangular transparent platen for supporting a document to be scanned, said platen defining an orthogonal X,Y coordinate system comprising a X-axis and a Y-axis intersecting at a (0,0) origin, wherein said X-axis is defined by a platen leading edge, said Y-axis is defined by a platen side edge, and said platen leading edge and said platen side edge meet at a document referencing corner which defines said origin, said coordinate system being oriented such that said transparent area is located within positive values of X and Y;
   b) a scanner leading edge portion comprising coordinate locations having a negative value of Y in said coordinate system, said scanner leading edge portion having a relatively high reflectivity;
   c) a scanner side edge portion comprising coordinate locations having a negative value of X in said coordinate system;
   d) a light source providing illumination on said platen, said scanner leading edge portion, and said scanner side edge portion, said illumination defining a scan line comprising a narrow linear light footprint;
   e) a linear array of light sensors, said array of light sensors providing analog voltages corresponding to light intensities;
   f) an array of reflection mirrors for focusing light reflected from said platen onto said linear array of light sensors;
   g) an analog to digital converter for converting said analog voltages into digital numerical values;
   h) a memory for storing said digital numerical values;
   i) a motor providing relative movement between said scan line and said platen, wherein movement is orthogonal to said X-axis;
   j) a home sensor for approximately locating said scan line relative to said origin in the Y-direction;
   k) multiple reference marks located within said scanner leading edge portion or said scanner side edge portion, each of said multiple reference marks having a reflectivity with a high contrast relative to said platen reflectivity, said reference marks being located a precise and known distance from said X-axis and said Y-axis;
   l) a controller for:
      i) moving said scan line relative to said platen to said home position;
      ii) moving said scan line relative to said platen in the positive Y direction over said reference marks;
      iii) storing in said memory light intensities from said light sensors, thereby storing images of said reference marks in said memory;
      iv) determining a coordinate location of each of said reference marks;
      v) using said determined coordinate locations of said reference marks, in combination with said known locations of said reference marks with respect to said X-Y coordinate system, to determine a location of said document referencing corner and an orientation of said platen with respect to said array of light sensors and said scan line.

16. A document scanner as in claim 15, wherein said controller also determines a location of a portion of said document to be scanned.

17. A document scanner as in claim 15, wherein at least one of said multiple reference marks is aligned with said Y-axis.

18. A document scanner as in claim 15, wherein said multiple reference marks are substantially black and said scanner leading edge portion and said scanner side edge portion each have a high reflectivity.

19. A document scanner as in claim 15, wherein each of said multiple reference marks is located at a different intersection of two substantially black edges.

20. A document scanner as in claim 15, wherein said platen is stationary and said scan line is moveable.

* * * * *

UNITED STATES PATENT AND TRADEMARK OFFICE
CERTIFICATE OF CORRECTION

PATENT NO. : 6,470,099 B1
DATED : October 22, 2002
INVENTOR(S) : Jacklyn Dowdy et al.

It is certified that error appears in the above-identified patent and that said Letters Patent is hereby corrected as shown below:

Column 16,
Line 36, delete "comer" and insert therefor -- corner --

Column 17,
Line 42, delete "plate n" and insert therefor -- platen --
Line 45, delete "s aid" and insert therefor -- said --

Signed and Sealed this

Eighth Day of March, 2005

JON W. DUDAS
*Director of the United States Patent and Trademark Office*